F. MAXSON.
Ore Amalgamator.
No. 25,840.  Patented Oct. 18, 1859.
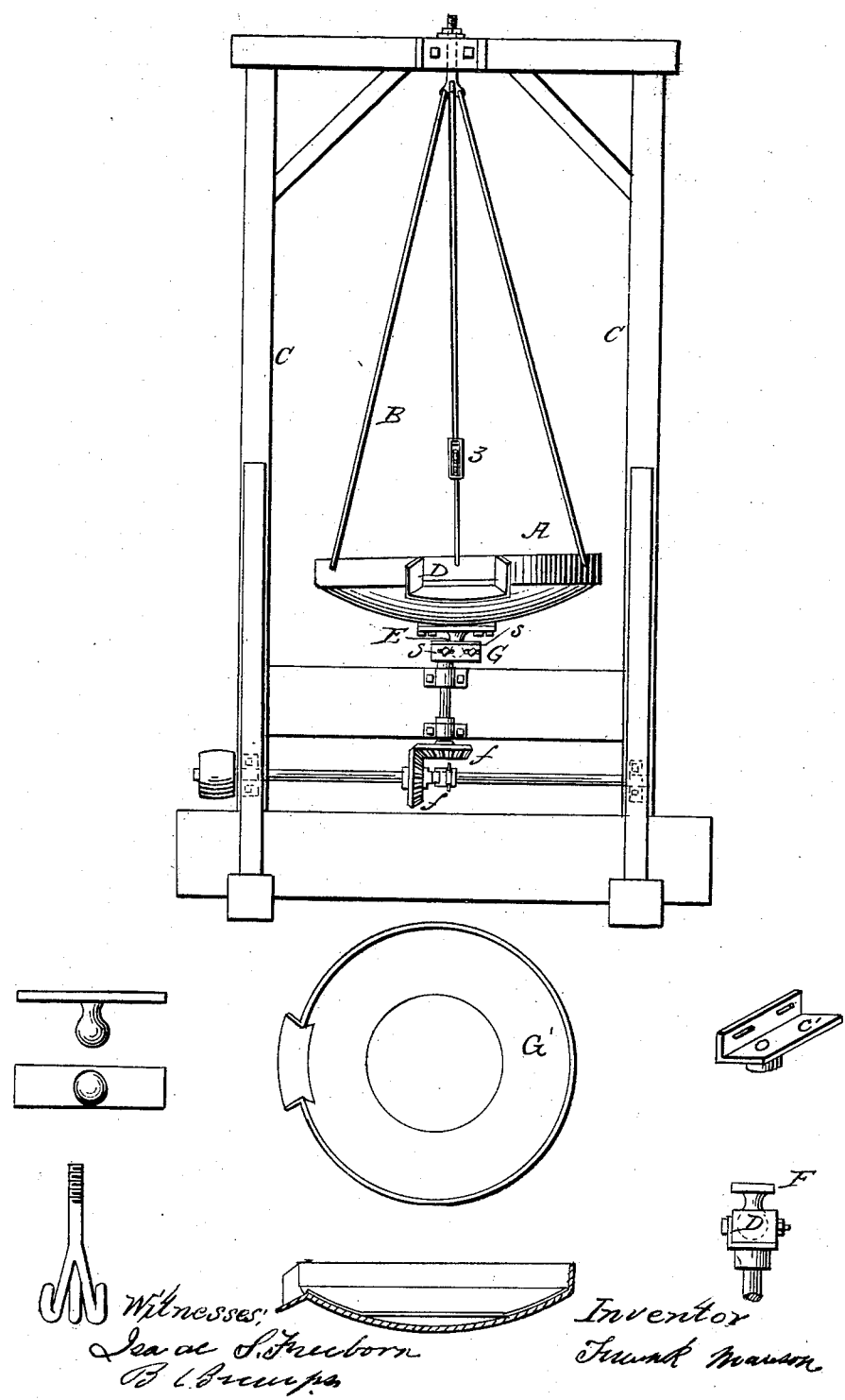

UNITED STATES PATENT OFFICE.

FRANK MAXSON, OF SAN FRANCISCO, CALIFORNIA.

AMALGAMATOR.

Specification of Letters Patent No. 25,840, dated October 18, 1859.

*To all whom it may concern:*

Be it known that I, FRANK MAXSON, of San Francisco, State of California, have invented a new and useful Improvement in Machines for Concentrating and Separating the Different Metals; and I do hereby declare that the following is a full, clear, and exact description of the construction and operation of the same, reference being had to the annexed drawings, making a part of this specification.

*Description of the power concentrating pan.*—A is a cast iron pan of any given size, with a concave bottom surrounded by a rim, of, say six (6) inches, more or less high, on one side of which is a discharging spout. This pan is suspended by three rods B attached to eyes in the top of the frame C, the rod on the opposite side from the spout to have a screw for the purpose of raising or lowering the spout D.

On the under side of the pan, and in the center, is a bracket or bearing for the crank pin or journal as shown in E, which, when the crank is set in motion by the lever gears $f$ $f$ gives the pan a rotary and reciprocating motion, depressing and raising the outer edges of the pan at every revolution; thereby concentrating all the precious metals, oxidized quick-silver and sulfurets at the bottom of the pan. I place a cast ball H or balls in the pan for the purpose of keeping the mass loose. I also place a copper plate covered with quick-silver on the bottom of the pan, as shown in G' for the purpose of collecting the fine particles of gold which are so light as otherwise to wash away. And for the purpose of operating said pan I key the shaft E to pinion F and flange C'. Bolted to G' is the wood D', C' being arranged with slotted holes to give more or less throw to the pan A, D' being in two parts with part of a hole in each, to conform to the size and shape of the projection pin F.

The object of the improvement is to lengthen or shorten the stroke by unscrewing the bolts G. Wood D' being released can be moved wherever desired, all being done in a few moments.

What I claim and desire to secure by Letters Patent is—

1. The use of the eccentric revolving pan constructed and operated as described in connection with the amalgamated plate as specified.

2. I also claim the arrangement of the shaft E, projection pin F, with the slotted piece C' and wood D' whereby a more or less eccentric motion is imparted to the pan A as described.

FRANK MAXSON.

Witnesses:
ISAAC S. FREEBORN,
B. STRAUSS.